United States Patent

Hilberg

[15] 3,688,279

[45] Aug. 29, 1972

[54] DATA STORAGE SYSTEM

[72] Inventor: Wolfgang Hilberg, Thalfingen, Germany

[73] Assignee: Licentia Patent-Vermaltungs G.m.b.H., Frankfurt am Main, Germany

[22] Filed: Nov. 2, 1970

[21] Appl. No.: 85,984

[30] Foreign Application Priority Data

Oct. 31, 1969 Germany..........P 69 42 346.7

[52] U.S. Cl......340/173 SP, 340/174 GA, 340/173 R

[51] Int. Cl...........................G11c 5/02, G11c 17/00

[58] Field of Search....340/173 FF, 173 SP, 174 GA, 340/172.5

[56] References Cited

UNITED STATES PATENTS

| | | | |
|---|---|---|---|
| 3,171,100 | 2/1965 | Rajchman | 340/173 SP |
| 3,339,089 | 8/1967 | Bergman | 340/173 FF |
| 3,553,659 | 1/1971 | Englund | 340/173 FF |
| 3,487,372 | 12/1969 | Vinal | 340/173 SP |
| 3,183,490 | 5/1965 | Cubbage | 340/173 SP |

*Primary Examiner*—Stanley M. Urynowicz, Jr.
*Attorney*—Spencer & Kaye

[57] ABSTRACT

A memory arrangement, including a plurality of memory elements which are capable of emitting output signals of different potentials in accordance with the stored information, which can be simultaneously utilized both as a permanent or read-only memory and as an operational or read-write memory. A pair of read-lines is associated with each memory element or column of memory elements. Each memory element is connected to only one of the two read-lines, which are biased with a rest potential different from those emitted by the memory elements, in accordance with the information permanently associated with the memory element. By determining which one of the pair of read-lines is not at the rest potential and the particular value of the potential of such read-line when the memory element is interrogated, both the permanently stored information and the temporarily stored information may simultaneously be read.

7 Claims, 2 Drawing Figures

*Inventor:*
Wolfgang Hilberg
BY Spencer & Kaye
ATTORNEYS.

DATA STORAGE SYSTEM

BACKGROUND OF THE INVENTION

The present invention relates to a data storage system whose storage or memory elements transmit signals to reading lines, either directly or after being converted, whose potential depends on the stored contents of the storage elements.

In the computer art large data stores, or memories are required. Memories formed from magnetic core, thin-film and semi-conductor memory elements are of particular interest for such large data memories because of the short access times that can be obtained.

In the above-mentioned types of memory elements the reading signals appear in the form of sudden potential changes in the reading lines which potentials have a clear relationship to the information content of the memory element or elements being interrogated. For example, in semiconductor memories wherein the memory elements are generally bistable flipflops the mode of operation of these flipflops produces output potentials which are of the magnitude, for example, of 0 and -1 volt depending on the state of the flipflop and thus the stored information.

According to the known state of the art, data stores or memories are generally organized either as operational or read-write (RW) memories or as permanent or read-only (RO) memories. In the read-write (RW) mode of operation, the memory elements are filled with information, which changes in the course of the operation or use of the memory. The information is written into the memory elements and is read out intermittently either with or without erasure of the stored information. In the read-only mode of operation, unchanging information is associated with each memory element which is not destroyed by the read-out process. Normally, separate memory arrangements are required for each of these modes of operation.

SUMMARY OF THE INVENTION

It is the object of the present invention to provide a memory organization which makes it possible to simultaneously use a data storage or memory system for both read-only and read-write modes of operation.

The above object is achieved according to the present invention by providing a memory arrangement wherein each memory element is associated with a pair of read-lines which are biased to a potential which is different from the potentials of the signals which are emitted by the memory elements; wherein the output of each memory element is connected to only one of the two associated read-lines in accordance with the permanent information associated with the memory element; and wherein logic circuit means are provided for determining to which of the two read-lines an interrogated memory element is connected as an indication of the permanently stored information and the potential on such read-line as an indication of the temporarily stored information.

According to a further feature of the invention, in the event it is determined that one or more memory elements in a memory plane or matrix are unusable or faulty, for example as a result of the manufacturing process, the unusable memory element is connected to both or preferably none of the two associated read-lines and the detected simultaneous occurrence of the same potential on both read-lines during interrogation utilized to provide a signal indicating the unusability of the memory element.

DESCRIPTION OF THE PREFERRED EMBODIMENT

Figure 1:
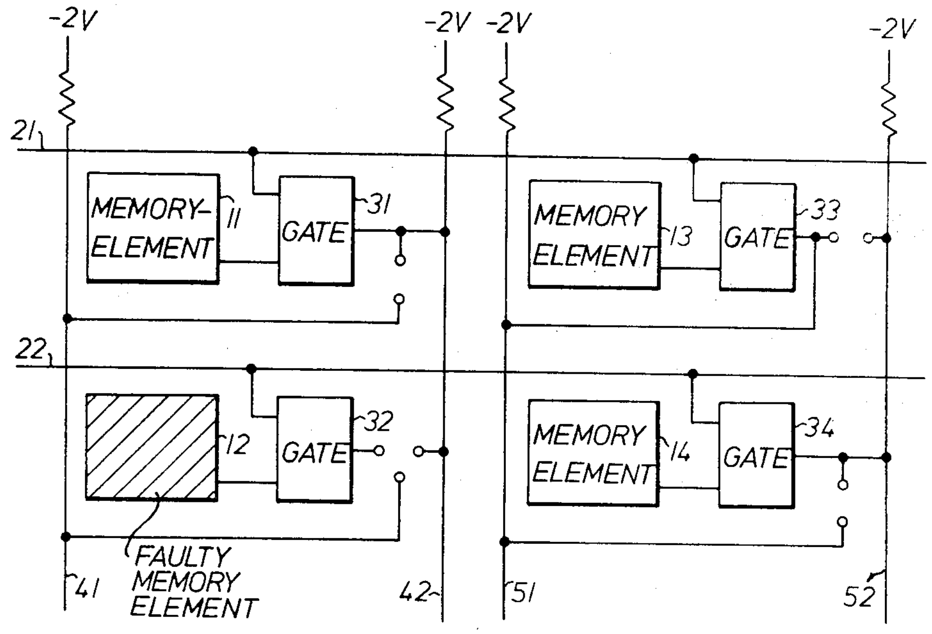
FIG. 1 is a schematic circuit diagram of an embodiment of a memory arrangement according to the invention.

Referring now to FIG. 1 there is shown a memory arrangement including four memory elements 11 through 14 which are arranged in rows and columns. For reasons of simplicity in explaining the invention, it is here assumed that the memory elements 11 through 14 are bistable flipflops which emit potentials of 0 or -1V depending on their information content. It is to be understood, however, that other types of memory elements which emit different potentials in accordance with the stored information may equally well be used. In the illustrated memory, it is assumed that memory element 12 is faulty and thus unusable for reasons to be more fully explained below.

The output of each of the memory elements 11 through 14 is connected to one input of a respective gate 31 –34 which, when enabled, permit the output signals of the respectively connected memory elements to pass. In order to enable the gates 31 –34 and thus interrogate the memory elements 11 –14, row interrogation lines 21 and 22 are provided which are connected to the enabling inputs of the gates 31 –34 in the respective row. When interrogation of a particular row of memory elements is desired, a potential which is different from the normal or rest potential is applied to the particular row interrogation line 21 or 22 which enables the respectively connected gates 31 –34 so that the output signals from the memory elements can be transmitted to the output or read-lines.

According to the invention each memory element 11 –14, or in the illustrated memory arrangement each column of memory elements, is provided with a pair of read-lines 41–42 or 51–52, respectively. However, the output of each of the memory elements 11, 13 and 14, which are considered to be properly functioning, is connected via the respective gate 31, 33, 34 to only one of the two associated read-lines 41–42 or 51–52 in accordance with the information which is to be permanently associated with the respective memory element. For example, memory element 11 is connected only to read-line 42 while memory element 13 is connected only with read-line 51.

Each of the read-lines 41, 42, 51, 52 has applied thereto a bias or rest potential which is different than the potentials of the signals emitted by the memory elements 11–14. In the illustrated embodiment, each of the read-lines is biased with a rest potential of –2V. Thus, during interrogation of a row of memory elements, e.g. memory elements 11 and 13, the read-lines to which these interrogated memory elements are connected, i.e. 42 and 51, respectively, will, instead of the rest potential of –2V, exhibit the potential transmitted by the memory element via the respective gate, i.e., either 0 or −1V, in accordance with the stored information. Thus, by monitering both read-lines of each pair of read-lines and evaluating or determining the potential of the read-line which is other than the rest potential, the information actually stored in the interrogated memory element can be determined. Accordingly, the memory may be operated in the read-write mode wherein the information stored in the memory may be changed by means of write lines (not shown).

Since as indicated above, each of the functioning memory elements 11, 13, 14 is connected to only one of the pair of associated read-lines, by proper selection of the connections according to a predetermined criterion, the resulting fixed relationship of the memory elements and read-lines provides for the permanent storage of information which permits the memory to simultaneously function as a read-only memory. That is, by connecting the memory elements to the respective one of the pair of associated read-lines according to the criterion that the occurrence of the rest potential on one read-line during interrogation represents a logic 0 while the occurrence of the rest potential on the other read-line during interrogation represents a logic 1 or L and by determining which of the read-lines of each pair has the rest potential during interrogation, the permanently stored information may be determined. For example, if according to the above criterion the occurrence of the rest potential on lines 42 and 52 during interrogation is considered to represent a logic 0, then the information permanently associated with memory elements 11 and 14 is a logic 1 while that associated with memory element 13 is a logic 0.

With large volume memory arrangements, and in particular memory arrangements utilizing semiconductor or thin-film memory elements, so called integrated memories are desirable. In such memories all of the substantially identical memory elements and their associated logic circuitry are simultaneously produced in a single process at their desired locations on a single memory substrate and then provided with all of the required leads. Preferably, in order to permit the information which is to be permanently stored in the memory for read-only operation to be "written" in the memory independent of the manufacturing process, as illustrated in FIG. 1, the memory is manufactured with each memory element being connected to both of its associated read-lines and then the unwanted connection is eliminated by providing a break or separation in one of the conductors, e.g. the separation 15 in the conductor 16 between read-line 21 and gate 31, by subsequent processing. Such separations can be produced as taught in applicant's copending U. S. application Ser. No. 48,300, filed June 22nd, 1970 in a number of different ways, for example, by etching or melting by the application of heat.

In the manufacture of such integrated memories containing a large number of simultaneously produced memory elements, it is practically unavoidable that at least some of the memory elements will be faulty and thus unusable. According to applicant's abovementioned copending application it is possible to mark and identify those memory elements which are faulty due to the manufacturing process by the provision of such breaks or separations in their output or read-lines and thus eliminate them from consideration. According to a further feature of the present invention, such faulty memory elements are identified in a particularly simple manner so that they can be eliminated from consideration, e.g., according to the system of the above-mentioned copending application.

As indicated above in FIG. 1 the memory element 12 shown in hatching is considered to be faulty. In order to identify this condition the output lead of gate 32 is broken so that it is not connected to either of the two read-lines 41, 42 associated with memory element 12 so that, during interrogation of memory element 12, the rest potential of −2V will remain unchanged both in read-line 41 and in read-line 42. The occurrence of the rest potential on both read-lines of a pair of read-lines is thus used as the criterion for the unusability of the interrogated memory element. A principally equivalent manner of identifying element 12 as being faulty is to connect the output of gate 32 to both read-lines 41 and 42 whereby the identical potential will again occur on both read-lines. In practice, however, this latter technique exhibits a number of drawbacks.

Figure 2:
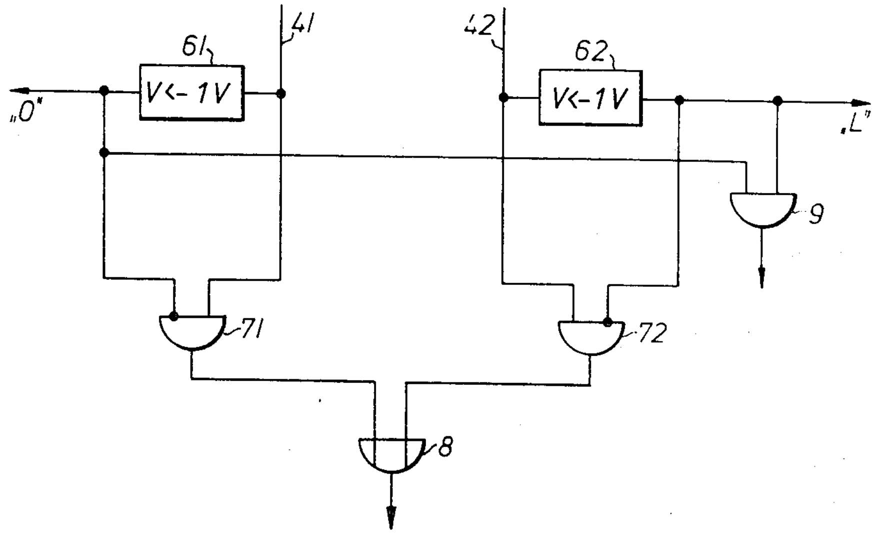
FIG. 2 is a logic diagram of an embodiment of a circuit utilized for reading the information stored in the memory arrangement of FIG. 1.

Turning now to FIG. 2, there is shown a logic circuit for simultaneously monitoring the pair of read-lines 41 and 42 for both read-only and read-write modes of operation.

Under the above-described conditions, i.e. that the rest potential of the read-lines is −2V, the reading signals from the memory elements 11, 13, 14 are −1 or 0V, and that the occurrence of the rest potential, during interrogation, in read-line 41 represents a "O ", and in read-line 42 represents an "L", each of the read-lines 41 and 42 is connected to the input of a threshold value circuit 61 or 62, respectively, which responds and provides an output signal when the potential V in the associated read-line is less than −1V. Thus the signals appearing at the outputs of threshold value circuits 61 and 62 during the interrogation period is a determination of which one of the read-lines 41 or 42 is connected to the interrogated memory element and thus of the permanently stored information associated with that memory element. Read-lines 41 and 42 are connected to one input of AND gates 71 and 72, respectively, which have second negated inputs which are connected with the outputs of threshold value circuit 61 or 62, respectively. With this interconnection, the appearance of an output pulse from a threshold value circuit indicating that the associated read-line is at the rest potential causes the respectively connected AND gate to be blocked and thus assures that only such potentials in the read-lines which are different from the rest potential can pass through AND gates 71 and 72. The outputs of AND gates 71 and 72 are connected with an OR gate 8 which transmits the information for evaluation as to the particular value of the potential and thus the stored content of the memory element.

As already described, the simultaneous occurrence of identical potentials in read-lines 41 and 42 is utilized as the criterion for the faultiness of the presently interrogated memory element. In FIG. 2 it is assumed that the faulty elements are not connected with any of the associated read-lines, as described for FIG. 1 in connection with memory element 12. Thus, monitoring is very simple. The outputs of threshold value circuits 61 and 62 are merely combined through a further AND gate 9 and if AND gate 9 is enabled, the output is an indication of the faultiness of the interrogated memory element. This indication may be utilized, for example, within the scope of applicant's above-mentioned copending application, to keep the information otherwise read-out of this memory element out of consideration. It is also possible, with the aid of this AND gate 9 and further logic circuit elements, to suppress the transmission of possibly occurring potentials from the faulty memory element.

It will be understood that the above description of the present invention is susceptible to various modifications, changes and adaptations, and the same are intended to be comprehended within the meaning and range of equivalents of the appended claims.

I claim:

1. A memory arrangement for use both as read-write and a read-only memory comprising, in combination:

a plurality of alterable memory elements, each of said memory elements being capable, when interrogated, of emitting electrical output signals of at least two different potentials in accordance with its temporarily stored information;

a pair of read-lines for each of said memory elements, the output of each memory element being permanently connected to one of the two associated read-lines in accordance with the binary value of the information permanently associated with the memory element;

means for biasing each of said read-lines with a rest potential which is different from the potentials of the signals emitted by said memory elements during read out;

means for interrogating said memory elements to cause the emission of said output signals; and circuit means connected to each pair of said read-lines and responsive to the potentials thereof for determining to which of the two read-lines the interrogated memory element is connected as an indication of the information permanently associated with the interrogated memory element and for determining the information stored temporarily in said interrogated memory element.

2. The memory arrangement defined in claim 1 wherein said circuit means includes means for determining which of the pair of read-lines associated with the interrogated memory element has said rest potential.

3. The memory arrangement defined in claim 2 wherein said means for determining which of the two read-lines has said rest potential comprises a pair of threshold circuits each of which has its input connected to a respective read-line of a pair of said read-lines; and wherein said circuit means further comprises a pair of AND gates, each of said AND gates having a first input connected to a respective one of said read-lines and a second negated input connected to the output of the associated one of said threshold circuits, and an OR gate having its inputs connected to the outputs of said AND gates.

4. The memory arrangement as defined in claim 1 wherein said plurality of memory elements are arranged in rows and columns, and wherein, one pair of read-lines is provided for each column of memory elements.

5. The memory arrangement as defined in claim 4 wherein said plurality of memory elements are identical elements which were simultaneously produced in a unitary structure; at least one of said memory elements is unusable, i.e. faulty, as a result of the manufacturing process, said unusable memory element being coupled to its associated pair of read-lines in a manner so that identical potentials appear on said associated pair of read-lines when the unusable memory element is interrogated; and means for detecting the simultaneous occurrence of the identical potentials on said pair of read-lines.

6. The memory arrangement as defined in claim 5 wherein said unusable memory element is connected to neither of its associated read-lines.

7. The memory arrangement as defined in claim 6 wherein said circuit means comprises: a pair of threshold circuits, each of which has its input connected to a respective read-line of a pair of said read-lines, for providing an output signal when the said rest potential is detected on the associated read-line; a pair of AND gates each of which has a first input connected to a respective one of said read-lines and a second negated input connected to the output of the associated one of said threshold circuits; and an OR gate having its inputs connected to the output of said AND gates; and wherein said means for detecting the simultaneous occurrence of identical potentials on said pair of read-lines comprises an AND gate having its inputs connected to the outputs of said threshold circuits.

* * * * *

UNITED STATES PATENT OFFICE
CERTIFICATE OF CORRECTION

Patent No. 3,688,279 Dated August 29th, 1972

Inventor(s) Wolfgang Hilberg

It is certified that error appears in the above-identified patent and that said Letters Patent are hereby corrected as shown below:

In the heading of the patent, line 4, change "Vermaltungs" to --Verwaltungs--; line 10, change "P 69 42 346.7" to --P 19 54 814.2--. Column 5, lines 42 and 43, change "stored temporarily" to --temporarily stored--.

Signed and sealed this 6th day of March 1973.

(SEAL)
Attest:

EDWARD M.FLETCHER,JR.
Attesting Officer

ROBERT GOTTSCHALK
Commissioner of Patents